(12) United States Patent
Ishida et al.

(10) Patent No.: US 6,800,347 B2
(45) Date of Patent: Oct. 5, 2004

(54) OPTICAL INFORMATION RECORDING MEDIUM

(75) Inventors: Toshio Ishida, Kanagawa (JP); Naoki Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 45 days.

(21) Appl. No.: 10/383,580

(22) Filed: Mar. 10, 2003

(65) Prior Publication Data

US 2003/0180496 A1 Sep. 25, 2003

(30) Foreign Application Priority Data

Mar. 14, 2002 (JP) ........................................ 2002-069580

(51) Int. Cl.[7] ................................................. B32B 3/02
(52) U.S. Cl. ..................... 428/64.1; 428/64.4; 428/64.8; 430/270.14; 430/270.16
(58) Field of Search ................................ 428/64.1, 64.4, 428/64.8, 913; 430/270.14, 270.16, 495.1, 945

(56) References Cited

FOREIGN PATENT DOCUMENTS

| EP | 1 239 467 A1 | 9/2002 |
|----|--------------|--------|
| EP | 1 239 468 A2 | 9/2002 |

OTHER PUBLICATIONS

Japanese Abstract No. 2002124383, dated Apr. 26, 2002.
Voigt M. et al., "Circularly Polarized Emission from a Narrow Bandwidth Dye Doped into a Chiral Nematic Liquid Crystal" Liquid Crystals, Taylor and Francis Ltd, London, GB, vol. 29, No. 5, May 2002, pp. 653–656, XP001102371.

*Primary Examiner*—Elizabeth Mulvaney

(74) *Attorney, Agent, or Firm*—Sughrue Mion, PLLC

(57) ABSTRACT

A high-density optical information recording medium comprising, on a substrate, a recording layer capable of recording information by irradiation of a laser beam at a wavelength of from 380 to 500 nm, wherein the recording layer contains a compound represented by the following general formula (I):

General formula (I)

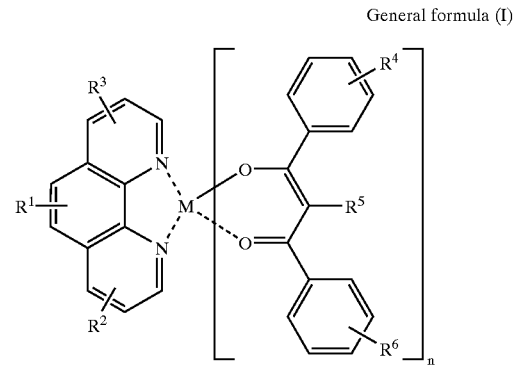

where $R^1$ to $R^6$ each represents, independently, a substituent, M represents a metal atom, and n represents an integer of 1 or greater.

17 Claims, No Drawings

OPTICAL INFORMATION RECORDING MEDIUM

BACKGROUND OF THE INVENTION

1. Field of the Invention

The present invention relates to an optical information recording medium and, more particularly, to an optical information recording medium capable of recording and reproducing information by laser beam irradiation. Particularly, it relates to a heat mode type optical information recording medium suitable for recording information by having a laser beam with a short wavelength of 380 to 500 nm irradiated thereon.

2. Description of the Related Art

Optical information recording media (optical disks) capable of recording information only once with a laser beam are conventionally known. Such optical disks are also referred to as write-once CDs (CD-Rs) and in a typical structure thereof, a recording layer comprising an organic compound such as an organic dye, a light reflective layer comprising a metal such as gold, and a protective layer made of a resin are laminated successively, in this order, on a transparent disk-shaped substrate. Information is recorded to a CD-R by irradiating a near-infrared laser beam (usually a laser beam with a wavelength near 780 nm) thereon, in which the irradiated area of the recording layer absorbs the beam. The temperature of the irradiated area increases, causing the optical characteristics of the area to undergo physical or chemical changes (e.g., the formation of pits) and the information is thus recorded.

With regards to reading (reproduction) of information, this is also conducted by irradiating a laser beam with a wavelength identical to that of the recording laser beam. Information reproduction from the CD-R is conducted by detecting the difference of the reflectivity in the recording area between the areas where the optical characteristics have been changed (recorded area) and not changed (unrecorded area).

In recent years, there has been a demand for optical information recording media possessing higher recording density. To meet this demand for greater recording capacity, an optical disk referred to as a write-once digital versatile disk (DVD-R) has been proposed (for example, see Nikkei New Media special volume "DVD", published in 1995). The DVD-R is configured by appending two disks, each usually formed by laminating a recording layer containing an organic dye, a light reflection layer and a protective layer, in this order, on a transparent disk-shaped substrate in which guide grooves (pre-grooves) for laser beam tracking are formed. The pre-grooves occupy a narrow area of the CD-R, specifically one-half or less of the CD-R (0.74–0.8 μm) and the recording layers of the disk are formed towards the inner portion of the disk. The CD-R can also be configured so that a disk-shaped protective substrate is included with the recording layer formed towards the inner portion of the disk. Information is recorded to and reproduced from the DVD-R by irradiating a visible laser beam thereon (usually a laser beam with a wavelength of about 630 nm to 680 nm), and thus, recording at a density higher than that of a CD-R is possible.

However, considering factors such as the recent spread of networks (e.g., Internet), the rapidly increasing popularity of high-vision TV, and the emergence of high definition television (HDTV) broadcasting, cheap and convenient recording media that are capable of recording image information at even larger capacity are required. While DVD-Rs sufficiently serve as high-capacity recording media at present, demand for larger capacity and higher density has increased. Hence, development of recording media capable of meeting such requirements has become essential, and much effort is being made to develop recording media with larger capacity capable of recording at high density at a shorter light wavelength than that of DVD-Rs.

Information recording and reproduction methods using an irradiated laser beam at a wavelength of 530 nm or less, wherein the laser beam is irradiated from the side of the recording layer to the side of the reflection layer in optical information recording media having organic dye recording layers, have been proposed. Examples of such media include JP-A Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818, and 2000-228028. In the methods described above, information is recorded and reproduced by irradiating a blue laser beam (wavelength: 430 nm, 488 nm) or blue-green laser beam (wavelength: 515 nm) onto an optical disk having a recording layer containing porphyrine compounds, azo dye, metal azo dye, quinophthalone dye, trimethincyanine dye, dicyanovinylphenyl skeleton dye, cumarin compounds and naphthalocyanine compounds.

Further, when considering compatibility with CD-R systems presently in use, optical information recording media capable of recording and reproducing with laser beams of two different wavelength regions have also been proposed. JP-A Nos. 2000-141900, 2000-158816, 2000-185471, 2000-289342 and 2000-309165 propose optical information recording media capable of recording and reproducing by any laser beams in the near-infrared region of about 780 nm and visible laser beams in the region of about 650 nm. These technologies propose using CD-R dyes and DVD-R dyes in admixture.

SUMMARY OF THE INVENTION

According to studies conducted by the present inventors, the optical disks described in the above patent publications can not obtain the sensitivity required for practical use when recording information by irradiation of a short wavelength laser beam at a wavelength of 380 to 500 nm. Furthermore, other recording characteristics such as reflectivity and modulation degree are not at satisfactory levels. Clearly, these technologies require further improvement. Particularly, in the optical disks described in the above patent publications, the recording characteristics actually deteriorated when irradiating a laser beam with a wavelength of 380 to 500 nm.

The present invention has been accomplished in view of the foregoing existing problems and intends to provide an optical information recording medium possessing superior recording characteristics, capable of high-density recording and reproduction of information by irradiation of a short wavelength laser beam, at a wavelength of 380 to 500 nm and, more particularly, a laser beam at a wavelength of near 405 nm, which has wide general usability.

In order to achieve the aforementioned purpose, the optical information recording medium according to the present invention provides a medium having, on a substrate, a recording layer capable of recording information by irradiation of a laser beam at a wavelength of 380 to 500 nm, in which the recording layer contains a compound represented by the following general formula (I) (hereinafter occasionally referred to as "compound of the invention"). The compound of the invention has an absorption band of approximately 340 nm. When the compound of the invention is used as a recording material for the recording layer, an optical information recording medium having satisfactory recording and reproduction characteristics, exhibiting high sensitivity even to a short wavelength laser beam at a wavelength of 380–500 nm, and providing high reflectivity and a high degree of modulation can be obtained.

General formula (I)

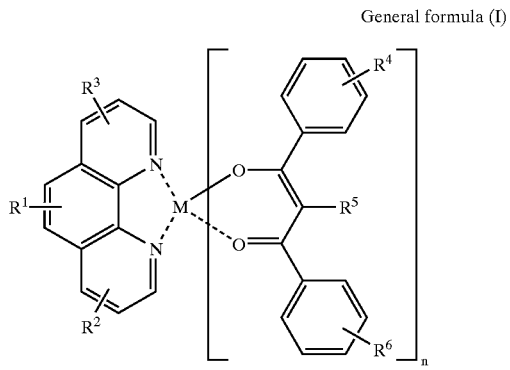

where $R^1$ to $R^6$ each represents, independently, a hydrogen atom or a substituent, and M represents a metal atom and n represents an integer of 1 or greater.

In the general formula (I) described above, the metal representing M is preferably copper, nickel, iron, cobalt, palladium, magnesium, aluminum, zinc, silicon or rare earth elements. Further, each of the substituent $R^1$ to $R^6$ is preferably an alkyl group of 1 to 20 carbon atoms, an aryl group of 6 to 14 carbon atoms, an aralkyl group of 7 to 15 carbon atoms, a heterocyclic ring group of 1 to 10 carbon atoms, an alkoxy group of 1 to 20 carbon atoms, an aryloxy group of 6 to 14 carbon atoms, an acyl group of 2 to 21 carbon atoms, an alkyl sulfonyl group of 1 to 20 carbon atoms, an aryl sulfonyl group of 6 to 14 carbon atoms, a carbamoyl group of 1 to 25 carbon atoms, a sulfamoyl group of 0 to 32 carbon atoms, an alkoxy carbonyl group of 1 to 20 carbon atoms, an aryloxy carbonyl group of 7 to 15 carbon atoms, an acylamino group of 2 to 21 carbon atoms, an amino group, a sulfonyl alkylamino group of 1 to 20 carbon atoms, a sulfonyl arylamino group of 6 to 14 carbon atoms, a sulfonyl amino group, or a halogen atom. Further, n is preferably an integer of 1 to 4.

The optical information recording medium according to the invention preferably has further a light reflection layer made of metal between the substrate and the recording layer and, more preferably, it has further a cover layer on the recording layer for protecting the recording layer. Further, it is preferred that pre-grooves at a track pitch of 0.2 to 0.5 μm are formed on the surface of the substrate on the side provided with the recording layer.

DESCRIPTION OF THE PREFERRED EMBODIMENTS

The present invention is to be explained in details with reference to preferred embodiments.

An optical information recording medium according to the invention provides an optical information recording medium having, on a substrate, a recording layer capable of recording information by irradiation of a laser beam in which the recording layer contains the compound represented by the following general formula (I).

General formula (I)

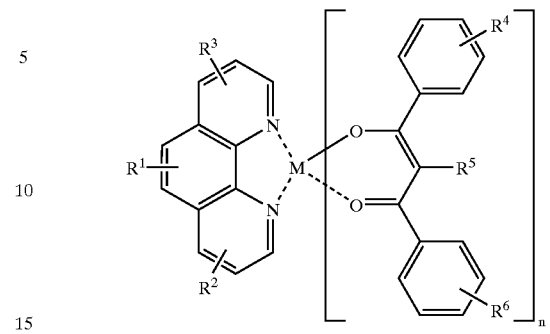

where $R^1$ to $R^6$ each represents, independently, a hydrogen atom or a substituent, and M represents a metal atom and n represents an integer of 1 or greater.

In the general formula (I), preferred examples of the substituent represented by $R^1$ to $R^6$ are an alkyl group of 1 to 20 carbon atoms, an aryl group of 6 to 14 carbon atoms, an aralkyl group of 7 to 15 carbon atoms, a heterocyclic ring group of 1 to 10 carbon atoms, an alkoxy group of 1 to 20 carbon atoms, an aryloxy group of 6 to 14 carbon atoms, an acyl group of 2 to 21 carbon atoms, an alkylsulfonyl group of 1 to 20 carbon atoms, an arylsulfonyl group of 6 to 14 carbon atoms, a carbamoyl group of 1 to 25 carbon atoms, a sulfamoyl group of 0 to 32 carbon atoms, an alkoxy carbonyl group of 1 to 20 carbon atoms, an aryloxy carbonyl group of 7 to 15 carbon atoms, an acylamino group of 2 to 21 carbon atoms, an amino group, a sulfonyl alkylamino group of 1 to 20 carbon atoms, a sulfonyl arylamino group of 6 to 14 carbon atoms, a sulfonyl amino group or a halogen atom. Preferred $R^1$ to $R^6$ are hydrogen atom, alkyl group, aryl group, alkoxy group, alkoxycarbonyl group, alkylsulfonyl group, acylamino group, amino group, and sulfonyl amino group, and, particularly, preferred are hydrogen atom, alkyl group, alkoxy group, and alkoxycarbonyl group.

In the general formula (I), each of the substituents $R^1$ and $R^6$ may further have a substituent and the example of the substituent can include those described below.

Chained or cyclic alkyl group of 1 to 20 carbon atoms (for example, methyl, ethyl, isopropyl, and cyclohexyl), aryl group of 6 to 18 carbon atoms (for example, phenyl, chlorophenyl, 2,4-di-t-amylphenyl, and 1-naphthyl), aralkyl group of 7 to 18 carbon atoms (for example, benzyl, and anisyl), alkenyl group of 2 to 20 carbon atoms (for example, vinyl and 2-methylvinyl), alkynyl group of 2 to 20 carbon atoms (for example, ethynyl, 2-methylethynyl , and 2-phenylethynyl), halogen atom (for example, F, Cl, Br, and I), cyano group, hydroxyl group, carboxyl group, acyl group of 2 to 20 carbon atoms (for example, acetyl, benzoyl, salicyloyl, and pivaloyl), alkoxy group of 1 to 20 carbon atoms (for example, methoxy, butoxy and cyclohexyloxy), aryloxy group of 6 to 20 carbon atoms (for example, phenoxy, 1-naphthoxy, and toluoyl), alkylthio group of 1 to 20 carbon atoms (for example, methylthio, butylthio, benzylthio and 3-methoxypropylthio), arylthio group of 6 to 20 carbon atoms (for example, phenylthio, and 4-chlorophenylthio), alkylsulfonyl group of 1 to 20 carbon atoms (for example, methane sulfonyl, and butane sulfonyl), arylsulfonyl group of 6 to 20 carbon atoms (for example, benzene sulfonyl, and paratoluene sulfonyl), carbamoyl group of 1 to 17 carbon atoms (for example, not-substituted carbamoyl, methyl carbamoyl, ethyl carbamoyl, n-butyl carbamoyl, and dimethyl carbamoyl), amide group of 1 to 16 carbon atoms (for example, acetoamide, and benzylamide), acyloxy group of 2 to 10 carbon atoms (for example, acetoxy, and benzoyloxy), alkoxycarbonyl group of 2 to 10 carbon atoms (for example, methoxy carbonyl, and ethoxy carbonyl), 5- or 6-membered heterocyclic group (for example, aromatic hetero ring such as pyridyl, thienyl, furyl, thiazolyl, imidazolyl, and pyrazolyl, hetero rings such as pyrrolidine ring, piperidine ring, morpholine ring, pyrane ring, thiopyrane ring, dioxane ring and dithiolane group), amino group, and acylamino group.

In the general formula (I), preferred substituents for the substitutes $R^1$ to $R^6$ are alkyl group, aryl group, alkoxy group, alkoxycarbonyl group, amino group, acylamino group, alkylsulfonyl group, and sulfonyl amino group, and particularly preferred are alkoxy group, alkoxycarbonyl group, amino group, and alkyl group.

In the general formula (I), n is, preferably, 1 to 3 and, further preferably, 2 to 3, and particularly preferably, 3. When n is an integer of 2 or greater, plural number of Rs may be identical or different with each other but they are preferably identical. Further, in the general formula (I), M represents a metal atom and, among them, copper, nickel, iron, cobalt, palladium, magnesium, aluminum, zinc, silicon, or rare earth element is preferred. The rare earth element described above is a collective name for 17 elements of scandium, yttrium, lanthanum, cerium, praseodymium, neodymium, promethium, samarium, europium, gadolinium, terbium, dysprosium, holmium, erbium, thulium, ytterbium and lutetium, with europium, zinc, copper, nickel, iron, cobalt and palladium being preferred for M.

The compound of the invention may be bonded at any position to form a polymer in which each of the units may be identical or different with each other, or they may be bonded to a polymer chain such as polystyrene, polymethacrylate, polyvinyl alcohol, or cellulose.

The compound represented by the general formula (I) used for the optical information recording medium according to the invention may be used alone as a specified derivative, or a plural kinds of them of different structures may be used in admixture, but it is preferably used alone. The compound of the invention may sometimes include inevitably substitution position isomers for the substituents $R^1$ to $R^6$ at its synthesization but such substitution position isomers can be regarded as an identical derivative not being distinguished from each other. Further, when the substituents $R^1$ to $R^6$ include isomers, they can be regarded, not being distinguished, as the identical compound of the invention. Accordingly, different structure means such a case that the species or the number of constituent atoms for the substituents $R^1$ to $R^6$ is different, or such a case where n is different according to explanation of the general formula (I).

Preferred specific examples of the compounds of the invention are shown below (exemplified compounds 1 to 6), but the invention is not restricted to them.

Compound 1

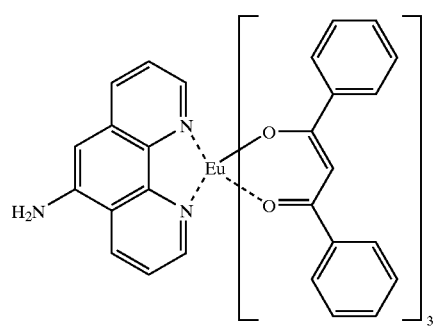

Compound 2

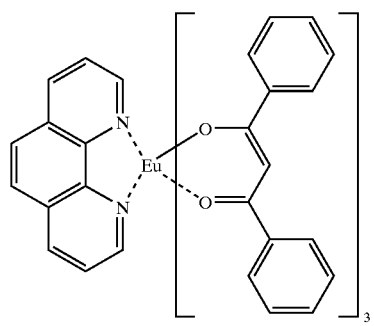

Compound 3

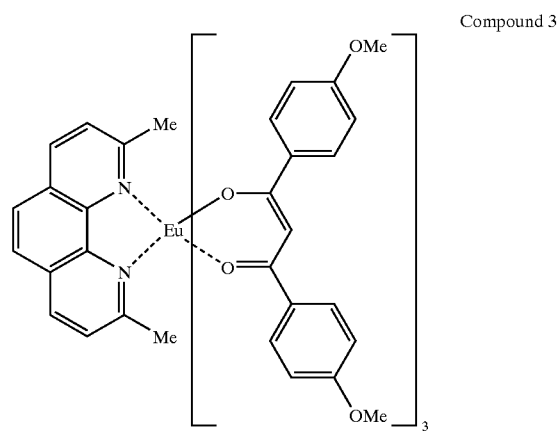

Compound 4

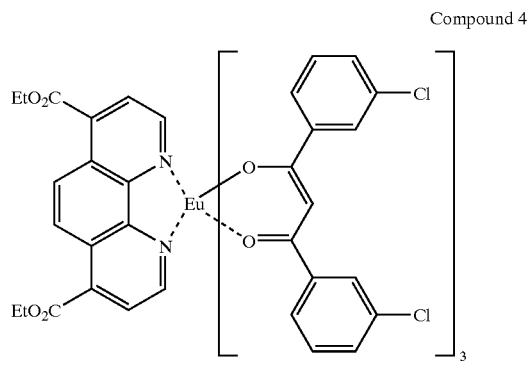

Compound 5

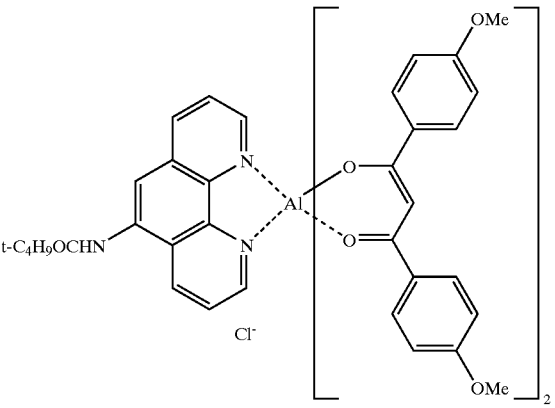

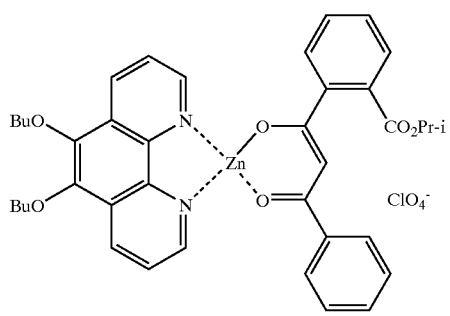

Compound 6

There is no particular restriction on the optical information recording medium according to the invention so long as the medium has a recording layer containing the compound of the invention on the substrate and they can be applied to optical information recording media of various constitutions. The optical information recording medium according to the invention may have a constitution in which a light reflection layer, a recording layer and a cover layer are present in this order on a disk-like substrate formed with pre-grooves at a predetermined track pitch. Now constitution of the optical information recording medium is to be described specifically to an example of an information recording medium having a light reflection layer, a recording layer and a cover layer in this order on a disk-like substrate.

As a substrate, various kinds of materials used as materials for substrates in existent optical information recording media can be optionally selected and used.

Specifically, they can include, for example, glass, polycarbonates, acrylic resins such as polymethyl methacrylate; vinyl chloride series resins such as polyvinyl chloride and polyvinyl chloride copolymer; epoxy resins; amorphous polyolefins; polyesters; and metals such as aluminum and they may be used in combination as required.

Among them, polycarbonates and amorphous polyolefins are preferred, with polycarbonates being particularly preferred in view of the moisture proofness, dimensional stability and low cost. Further, the thickness of the substrate is preferably 1.1±0.3 mm.

Guide grooves for tracking and unevennesses representing information such as address signals (pre-grooves) are formed to the substrate. For attaining higher recording density, use of a substrate formed with pre-grooves at a narrower track pitch compared with CD-R or DVD-R is preferred. The track pitch of the pre-grooves is preferably within a range from 200 to 500 nm and, more preferably, within a range from 250 to 350 nm. Further, the depth (groove depth) of the pre-groove is essentially within a range from 20 to 150 nm and, preferably, within a range from 50 to 120 nm.

In a case where a light reflection layer to be described later is provided, an under coating layer is preferably formed to the surface of the substrate on the side provided with a light reflection layer with an aim of improving the planarity and improvement of the adhesion.

The material for the undercoating layer, can include, for example, polymeric materials such as polymethyl methacrylate, acrylic acid-methacrylic acid copolymer, styrene-maleic acid anhydride copolymer, polyvinyl alcohol, N-methylol acrylamide, styrene-vinyl toluene copolymer, chlorosulfonated polyethylene, nitrocellulose, polyvinyl chloride, chlorinatedpolyolefin, polyester, polyimide, vinyl acetate-vinyl chloride copolymer, ethylene-vinyl acetate copolymer, polyethylene, polypropylene and polycarbonate; and surface modifying agents such as silane coupling agents.

The undercoating layer can be formed by preparing a coating liquid by dissolving or dispersing the material described above into an appropriate solvent and then coating the coating liquid on the surface of a substrate by a coating method such as spin coating, dip coating, or extrusion coating. The thickness of the undercoating layer is, generally, within a range from 0.005 to 20 μm and, preferably, within a range from 0.01 to 10 μm.

A light reflection layer is preferably disposed to the optical information recording medium of the invention. For the light reflection layer, a light reflecting material having a high reflectance to laser beam is used. The reflectance is preferably 70% or more.

The light reflecting material having high reflectance can include, for example, metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, or stainless steels. The light reflecting material may be used alone or may be used in a combination of two or more of them, or as an alloy. Among them, preferred are Cr, Ni, Pt, Cu, Ag, Au and Al, as well as stainless steels. Particularly preferred are Au, Ag, Al or alloys thereof and most preferred are Au, Ag or alloys thereof.

A light reflection layer can be formed on the substrate, for example, by vapor depositing, sputtering or ion plating the light reflecting material described above. The thickness of the light reflection layer is, generally, within a range of from 10 to 300 nm and, preferably, within a range from 50 to 200 nm.

The recording layer can be formed by a method, for example, of vapor deposition, sputtering, CVD, or solvent coating, solvent coating or vapor deposition being preferred. In a case of forming the recording layer by the solvent coating, it can be formed by dissolving the compound of the invention described above and, further, a quencher, a binder or the like as required into a solvent to prepare a coating solution and then coating the coating solution to the surface of a substrate (light reflection layer in a case of forming the light reflection layer) to prepare a coating film and then drying the thus formed coating film. The solvent for the coating solution can include, for example, esters such as butyl acetate, ethyl lactate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as dibutylether, diethylether, tetrahydrofuran and dioxane; alcohols such as ethanol, n-propanol, isopropanol, n-butanol, and diacetone alcohol; fluoric solvents such as 2,2,3,3-tetrafluoropropanol; and glycol ethers such as ethylene glycol monomethyl ether, ethylene glycol monoethyl ether and propylene glycol monomethyl ether. The solvent described above can be used alone or as a combination of two or more of them while considering the solubility of the recording material to be used. In the coating solution, various kinds of additives such as antioxidant, UV-absorber, plasticizer and lubricant may be added depending on the purpose.

In a case of using the binder, examples of the binder can include, for example, natural organic polymeric materials such as gelatin, cellulose derivatives, dextran, rosin and rubber; and synthetic organic polymers, for example, hydrocarbon resins such as polyethylene, polypropylene, polystyrene, and polyisobutylene, vinylic resins such as polyvinyl chloride, polyvinylidene chloride, polyvinyl chloride-polyvinyl acetate copolymer, acrylic resins such as methylpolyacrylate and methyl polymethacrylate, polyvinyl alcohol, chlorinated polyethylene, epoxy resin, butyral resin, rubber derivatives, and initial condensates of thermosetting resins such as phenol formaldehyde resin. In a case of using the binder as the material for the recording layer, the amount of the binder used is, generally, within a range from 0.01 to 50 times (mass ratio) and, preferably, within a range from 0.1 to 5 times (mass ratio) based on the based on the dye (compound of the invention). The concentration of the dye in the thus prepared coating solution is, generally, within a range from 0.01 to 10 mass % and, preferably, within a range of from 0.1 to 5 mass %.

The coating method can include, for example, spraying, spin coating, dipping, roll coating, blade coating, doctor roll method and screen printing. The coating temperature at 23 to 50° C. shows no particular problem, and it is, preferably, from 24 to 40° C. and, more preferably, from 25 to 37° C.

The vapor deposition may be conducted at any temperature so long as it is lower than the decomposing temperature by induction heating and it is conducted, preferably, at a temperature of 400° C. or lower and at a vacuum degree of $10^{-3}$ mPa or less and, more preferably, at a temperature of 300° C. or lower at a vacuum degree of $10^{-4}$ mPa or less.

The recording layer may be a single layer or a stacked layer and the thickness of the recording layer is, generally, within a range from 20 to 500 nm, more preferably, within a range from 30 to 300 nm and, further preferably, within a range from 50 to 100 nm.

Various kinds of discoloration inhibitors can be incorporated into the recording layer in order to improve the light fastness of the recording layer.

As the discoloration inhibitor, a single state oxygen quencher is used generally. The single state oxygen quenchers that have already been described in the known publications such as patent specifications can be utilized. The concrete examples of them can include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, JP-B Nos. 1-38680, and 6-26028, Specification of German Patent No. 350399 and the Journal of Japanese Chemical Society, 1992, No. 10, p-1141. Examples of preferred single state oxygen quencher can include the compounds represented by the following general formula (II):

General Formula (II)

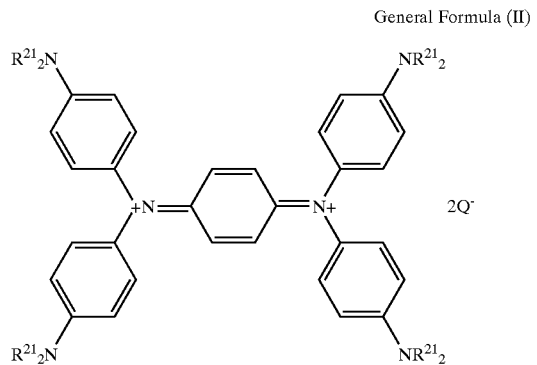

where $R^{21}$ represents an alkyl group which may have a substituent and $Q^-$ represents an anion.

In the general formula (II), $R^{21}$ is, generally, an alkyl group of 1 to 8 carbon atoms which may be substituted, and not substituted alkyl group of 1 to 6 carbon atoms being preferred. The substituent for the alkyl group can include halogen atom (for example, F, and Cl), alkoxy group (for example, methoxy, and ethoxy), alkylthio group (for example, methylthio, and ethylthio), acyl group (for example, acetyl, and propionyl), acyloxy group (for example, acetoxy, and propionyloxy), hydroxyl group, alkoxy carbonyl group (for example, methoxy carbonyl, and ethoxy carbonyl), alkenyl group (for example, vinyl), and aryl group (for example, phenyl, and naphthyl). Among them, halogen atom, alkoxy group, alkylthio group and alkoxy carbonyl group are preferred. Preferred examples of $Q^-$ anion can include $ClO_4^-$, $AsF_6^-$, $BF_4^-$, and $SbF_6^-$.

Examples of the compound represented by the general formula (II) are described in Table 1.

| Compound No. | $R^{11}$ | $Q^-$ |
|---|---|---|
| II-1 | $CH_3$ | $ClO_4^-$ |
| II-2 | $C_2H_5$ | $ClO_4^-$ |
| II-3 | $n-C_3H_7$ | $ClO_4^-$ |
| II-4 | $n-C_4H_9$ | $ClO_4^-$ |
| II-5 | $n-C_5H_{11}$ | $ClO_4^-$ |
| II-6 | $n-C_4H_9$ | $SbF_6^-$ |
| II-7 | $n-C_4H_9$ | $BF_4^-$ |
| II-8 | $n-C_4H_9$ | $AsF_6^-$ |

The amount of the discoloration inhibitor such as the single state oxygen quencher to be used is, usually, within a range from 0.1 to 50 mass %, preferably, within a range from 0.5 to 45 mass %, more preferably, within a range from 3 to 40 mass % and, particularly, preferably, within a range from 5 to 25 mass % based on the amount of dye (compound of the invention).

A cover layer is disposed preferably on the recording layer with an aim of physically and chemically protecting the recording layer and the like. There is no particular restriction on the cover layer so long as it is made of a transparent material, and polycarbonate, cellulose triacetate, or the like is preferred with a view point of preventive intrusion of moisture to the inside of the optical information recording medium, and, those materials having a moisture absorption ratio of 5% or less at 23° C., RH 50% are further preferred.

"Transparent" means such an extent of transparency as transmitting the light for recording light and reproduction light (transmittance: 90% or higher).

The cover layer can be formed by way of an adhesion layer comprising an adhesive. Specifically, it is formed by dissolving a photo-curable resin constituting the adhesion layer into an appropriate solvent to prepare a coating solution, coating the coating solution at a predetermined temperature on the recording layer to form a coating film, laminating a cellulose triacetate film (TAC film) obtained, for example, by extrusion of plastics on the recording layer and irradiating a light from above the TAC film to cure the coating film. As the TAC film, those containing a UV-ray absorbent are preferred. The thickness of the cover layer is within a range from 0.01 to 0.2 mm, preferably, within a range from 0.03 to 0.1 mm, more preferably, within a range from 0.05 to 0.095 mm.

For the viscosity control, the coating temperature is preferably, within a range from 23 to 50° C., more preferably, within a range from 24 to 40° C. and, further preferably, within a range from 25 to 37° C.

For preventing the warp of the disk, irradiation of a light such as UV-rays is preferably conducted to the coating film by using a pulsating light irradiation device (preferably, UV-irradiation device at a pulse interval of msec or less and, more preferably, UV irradiation device at a pulse interval of μsec or less). The pulse interval is, preferably, msec or less and, more preferably, psec or less. While there is no particular restriction on the amount of irradiation light per 1 pulse, it is, preferably, 3 kW/cm² or less and, more preferably, 2 kW/cm² or less. While there is no particular restriction on the cycles of irradiation, it is, preferably, 20 cycles or less and, further preferably, 10 cycles or less.

With the steps described above, an optical information recording medium in which a light reflection layer, a recording layer and a cover layer are disposed on the substrate can be produced.

Recording of information to the optical information recording medium according to the invention is conducted, for example, as described below. At first, while rotating the optical information recording medium at a constant linear velocity or at a constant angular velocity, a light for recording such as a semiconductor laser beam is irradiated on the side of the substrate or on the side of the cover layer. It is considered that by the irradiation of the light, the recording layer absorbs the light to locally rise the temperature and causes physical or chemical change (for example, formation of pits) to change the optical characteristics thereof and record the information. In the invention, a semiconductor laser beam having an oscillation wavelength within a range from 380 to 500 nm may be used as a recording light source.

A laser beam source having an oscillation wavelength of 380 to 500 nm can include a blue semiconductor laser beam having an oscillation wavelength within a region from 390 to 415 nm, a blue-green semiconductor laser beam with a central oscillation frequency of 515 nm, and a blue-purple SHG laser beam having a central oscillation wavelength of 425 nm comprising an infrared semiconductor laser beam having a central oscillation wavelength of 850 nm and an optical waveguide type wavelength converting device (SHG). In view of the recording density, use of the blue semiconductor laser beam is particularly preferred. Further, for improving the recording density, the numerical aperture (NA) of an objective length used as a pick-up is, preferably, 0.7 or more and, more preferably, 0.85 or more.

Information recorded as described shove can be regenerated by irradiating a laser beam on the side of the substrate or on the side of the cover layer while rotating the optical information recording medium at a constant linear velocity or at a constant angular velocity identical with that described above and detecting the reflection light therefrom.

An optical information recording medium according to the invention can be constituted into a structure of appending two laminates each having a recording layer and a light reflection layer formed on a transparent disk-like substrate formed with pre-grooves at a predetermined track pitch to each other with the respective recording layers being on the inside in the same manner as in the existent DVD-R. Alternatively, it may be of such a structure that the laminate is appended with a disk-like protection substrate of an identical shape with the recording layer being inside. In the appending structure, a transparent substrate, for example, having a diameter of 120±3 mm and a thickness of 0.6±0.1 mm is used and adjusted such that the thickness of the optical information recording medium after appending is 1.2±0.2 mm. Appending may be conducted by using a UV-curable resin used for the formation of the cover layer, or by using a synthetic adhesive. Further, they may be appended by using a both face adhesive tape.

EXAMPLES

The present invention is to be described more specifically by way of examples shown below but the invention is not restricted to the following examples.

Example 1

Ag was sputtered to form a light reflection layer of 120 nm thickness on a substrate having spiral grooves (track pitch 340 nm, groove depth 20 nm, groove width 160 nm) with 1.1 mm thickness and 120 mm diameter made of an injection molded polycarbonate resin (polycarbonate, manufactured by Teijin Co., trade name of products: PANLITE AD5503) on the surface having the grooves. Then, the compound represented by the general formula (I) (exemplified compound 1) was mixed with 1% methyl lactate, and dissolved by using supersonic waves for 2 hours to prepare a dye coating solution (concentration 3%). The dye coating solution was coated to a film thickness of 10 to 200 nm on the reflection layer under the conditions at 23° C., 50% RH by a spin coating method while changing the number of rotation from 300 rpm to 4000 rpm to form a recording layer.

Then, annealing was conducted at 23° C., 50% RH for 2 hours and, subsequently, ZnS—$SiO_2$ was sputtered by 5 nm thickness. UV-curable adhesive (SD661, manufactured by Dai-Nippon Ink Co.) was defoamed under vacuum for 6 hours and then coated by spin coating at the inner circumference 30 mm inside of the outer edge under 30 to 300 rpm, to which a polycarbonate sheet of 80 $\mu$m thick (PUREACE, manufactured by Teijin Co.) was stacked, then the adhesive was extended over the entire surface while changing the rotation from 30 rpm to 8000 rpm, and then UV-rays were irradiated from UV irradiation lamps to conduct curing and manufacture an optical disk of Example 1.

Example 2

An optical disk of Example 2 was manufactured in the same manner as in Example 1 except for replacing the compound represented by the general formula (I) from the exemplified compound 1 to the exemplified compound 2 in Example 1.

Example 3

Ag was sputtered to form a light reflection layer of 120 nm thickness to a substrate having spiral grooves (tracking pitch 340 nm, groove depth 20 nm, groove width 160 nm) with 1.1 mm thickness and 12 mm diameter made of an injection molded polycarbonate resin (polycarbonate, manufactured by Teijin Co., trade name of products: PANLITE AD5503) on the surface having the grooves. Then, the compound represented by general formula (I) (exemplified compound 3) was vapor deposited to a thickness of 30 nm to 50 nm to form a recording layer.

Then, annealing was conducted at 23° C., 50% RH for 2 hours and, ZnS—$SiO_2$ was sputtered at 5 nm thickness. Then, UV-curable adhesive (SD661, manufactured by Dai-Nippon Ink Co.) was defoamed under vacuum for 6 hours and then coated by spin coating at the inner circumference 30 mm inside the outer edge under 30 to 300 rpm, to which a polycarbonate sheet of 80 $\mu$m thick (PUREACE, manufactured by Teijin Co.) was stacked and then the adhesive was extended over the entire surface while changing the rotation from 30 rpm to 8000 rpm and then UV-rays were irradiated from UV irradiation lamps to conduct curing and manufacture an optical disk of Example 3.

Examples 4–6

Optical disks of Examples 4 to 6 were manufactured in the same manner as in Example 3 except for changing the compound represented by the general formula (I) from the compound (exemplified compound 3) to the exemplified compounds 4 to 6, respectively in Example 3.

Comparative Example 1

An optical disk of Comparative Example 1 was manufactured in the same manner as in Example 3 except for changing the compound represented by the general formula (I) (exemplified compound 3) to AgInSbTe (phase changing inorganic material) and forming a recording layer by sputtering in Example 3.

Evaluation as optical disk 1

For each of the manufactured optical disks, not recorded reflectance and 2T signals were recorded and C/N was measured by using DDU-1000 (manufactured by Pulse Tech Co.) having a laser beam at 405 nm. The result is shown in Table 2. In the recording layer forming method in Table 2, "A" represents the spin coating method and "B" represents the vapor deposition method.

TABLE 2

| | Compound | Recording layer forming method | Not-recorded reflectance (%) | 2TC/N (dB) |
|---|---|---|---|---|
| Example 1 | 1 | A | 50 | 50 |
| Example 2 | 2 | A | 45 | 48 |
| Example 3 | 3 | B | 45 | 46 |
| Example 4 | 4 | B | 46 | 44 |
| Example 5 | 5 | B | 44 | 45 |
| Example 6 | 6 | B | 42 | 47 |
| Comp. Example 1 | Phase changing inorganic material | Sputtering | 18 | 45 |

From the result shown in Table 2, it can be seen that the optical disks each having a recording layer containing the compound represented by the general formula (I) as a feature of the invention (Examples 1 to 6) show higher reflectance to the laser beam at a wavelength of 405 nm, compared with an optical disk having a recording layer containing AgInSbTe (phase changing inorganic material) (Comparative Example 1). Further, it can also be seen that C/N is also higher compared with the comparative example. Accordingly, it can be seen that an optical disk having high recording characteristics to a short wavelength laser beam at a wavelength of 380 to 500 nm can be obtained by using the compound represented by the general formula (I) in accordance with the invention.

The optical information recording medium according to the present invention provides an effect capable of high density recording and reproduction of information by irradiation of a short wavelength laser beam at a wavelength from 380 to 500 nm, particularly, a laser beam at a wavelength near 405 nm having high general utilizability, and having favorable recording/reproduction characteristics of high sensitivity, high reflectance and high modulation degree by using the compound according to the invention for the recording material in the recording layer. That is, information can be recorded at higher density than that in the existent CD-R or DVD-R and larger capacity information recording is possible.

What is claimed is:

1. An optical information recording medium comprising, on a substrate, a recording layer capable of recording information by irradiation of a laser beam with a wavelength of from 380 to 500 nm, in which the recording layer contains a compound represented by the following general formula (I):

General formula (I)

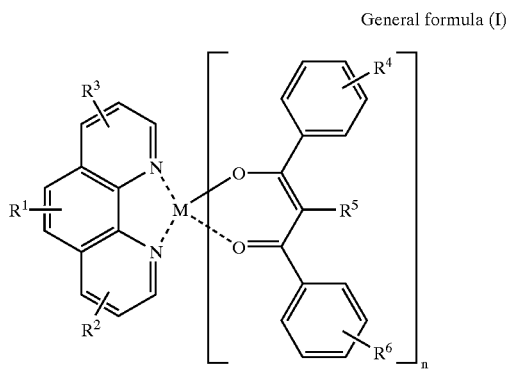

where $R^1$ to $R^6$ each represents, independently, a hydrogen atom or a substituent, and M represents a metal atom and n represents an integer of 1 or greater.

2. An optical information recording medium as defined in claim 1, wherein each of $R^1$ to $R^6$ in the general formula (I) is a group selected from the group consisting of a hydrogen atom, an alkyl group, an aryl group, an alkoxy group, an alkoxycarbonyl group, an alkylsulfonyl group, an acylamino group, an amino group and a sulfonylamino group.

3. An optical information recording medium as defined in claim 1, wherein each of $R^1$ to $R^6$ of the general formula (I) is a group selected from the group consisting of a hydrogen atom, an alkyl group, an alkoxy group and an alkoxycarbonyl group.

4. An optical information recording medium as defined in claim 2, wherein each of $R^1$ to $R^6$ in the general formula (I) further comprises, as a substituent group, a group selected from the group consisting of an alkyl group, an aryl group, an alkoxy group, an alkoxycarbonyl group, an amino group, an acylamino group, an alkylsulfonyl group and a sulfonyl amino group.

5. An optical information recording medium as defined in claim 1, wherein n in the general formula (I) is a number selected from 1 to 3.

6. An optical information recording medium as defined in claim 1, wherein M in the general formula (I) is an element selected from the group consisting of copper, nickel, iron, cobalt, palladium, magnesium, aluminum, zinc, silicon and europium.

7. An optical information recording medium as defined in claim 1, wherein M in the general formula (I) is europium.

8. An optical information recording medium as defined in claim 1, wherein M in the general formula (I) is aluminum.

9. An optical information recording medium as defined in claim 1, wherein M in the general formula (I) is zinc.

10. An optical information recording medium as defined in claim 1, wherein the compound represented by the general formula (1) is a polymer.

11. An optical information recording medium as defined in claim 1, wherein the compound represented by the general formula (I) is bonded with a polymer chain of a polymer selected from the group consisting of a polystyrene, a polymethacrylate, a polyvinyl alcohol, and a cellulose.

12. An optical information recording medium as defined in claim 1, wherein the substrate is selected from the group consisting of a glass, a polycarbonate, a polyacryl resin, a polyvinyl chloride, a vinyl chloride series resin, an epoxy resin, an amorphous polyolefin, a polyester and an aluminum.

13. An optical information recording medium as defined in claim 1, wherein pre-grooves are formed on the substrate and the track pitch of the pre-grooves is within a range from 200 to 500 nm.

14. An optical information recording medium as defined in claim 1, wherein the pre-groove is formed on the substrate and the depth of the pre-grooves is 20 to 150 nm.

15. An optical information recording medium as defined in claim 1, wherein a light reflection layer is further provided in addition to the recording layer.

16. An optical information recording medium as defined in claim 1, wherein the recording layer comprises a discoloration inhibitor.

17. An optical information recording medium as defined in claim 16, wherein the discoloration inhibitor is a singlet oxygen quencher.

* * * * *